United States Patent
Brotz

(10) Patent No.: US 6,189,829 B1
(45) Date of Patent: Feb. 20, 2001

(54) APPARATUS AND METHOD UTILIZING CELLS TO PROVIDE LIFT IN LIGHTER-THAN-AIR AIRSHIPS

(76) Inventor: Gregory R. Brotz, P.O. Box 1322, Sheboygan, WI (US) 53081

( * ) Notice: Under 35 U.S.C. 154(b), the term of this patent shall be extended for 0 days.

(21) Appl. No.: 09/344,405

(22) Filed: Jun. 24, 1999

(51) Int. Cl.[7] .................................................. B64B 1/68
(52) U.S. Cl. ................... 244/30; 244/24; 244/31
(58) Field of Search .................. 244/24, 30, 31, 244/33

(56) References Cited

U.S. PATENT DOCUMENTS 4,032,085 * 6/1977 Papst ........................................ 244/30
5,890,676 * 4/1999 Coleman et al. ....................... 244/30

FOREIGN PATENT DOCUMENTS

450815 * 8/1948 (CA) ...................................... 244/24

* cited by examiner

Primary Examiner—J. Woodrow Eldred
(74) Attorney, Agent, or Firm—William Nitkin

(57) ABSTRACT

An apparatus and method for floating such apparatus in the air, such apparatus having at least one cell containing air and a fluid. The fluid in one embodiment is heated to create steam which, in turn, makes the cell lighter than the surrounding air, thereby providing lift to the apparatus.

21 Claims, 11 Drawing Sheets

APPARATUS AND METHOD UTILIZING CELLS TO PROVIDE LIFT IN LIGHTER-THAN-AIR AIRSHIPS

BACKGROUND OF THE INVENTION

1. Field of the Invention

The apparatus and method of this invention reside in the area of lighter-than-air airships such as those used in blimps and dirigibles and more particularly relate to a system of cells having steam or heated combustion byproducts generated therein to provide lift to such airships.

2. Description of the Prior Art

Airships, such as blimps and dirigibles, have long been in use, and lighter-than-air gases such as hydrogen or helium typically have been utilized to cause the craft to be lighter than air. However, helium gas is expensive, and hydrogen gas is highly flammable.

SUMMARY OF THE INVENTION

It is an object of this invention to utilize steam or heated combustion byproducts generated in a single cell or a plurality of cells in an airship to provide the necessary lift for the apparatus of this invention.

It is a further object of this invention to provide means for transforming water contained within cells in the envelope of an airship into steam by use of microwaves. The cells can also contain a percentage of volume of lighter-than-air gases such as helium.

One embodiment of this invention utilizes multiple cells contained within an airship, within each of which steam is generated. Each cell is made of a lightweight, durable outer skin which forms the side walls. Such durable outer skin can be made of plastic, plastic film, metal, ceramic or equivalent material. The walls of the cells, depending on the embodiment, can be rigid, flexible or elastic. In one embodiment shown herein the cell's side walls are in a collapsed bellows shape, and the cells have a top and bottom attached, respectively, to the tops and bottoms of the side walls. The side walls in a collapsed mode can fold in accordion fashion. Within each cell is some fluid, such as water, and connected to each cell is a heating means to turn such fluid to steam. A microwave heater can be used in some embodiments to heat the fluid, such as water, to turn it to steam. When, for example, the water contained in each cell is sufficiently heated, it is transformed into steam, resulting in increased internal pressure in the cell and forcing its top to move in an upward direction. The generation of heated steam within a cell, when combined with heated steam production in the other cells and the expansion of the cells by such heated steam, results in each cell becoming lighter than air, thereby providing the lift to be imparted to the airship. A magnetron, klystron or infrared heater can be provided for the production of heat to create the steam within each cell.

The cells can have many shapes as long as they allow for expansion to take place. Some cells can be substantially circular with curved sides. Insulation can be provided to the cell to reduce heat loss.

DESCRIPTION OF THE PREFERRED EMBODIMENT(S)

Figure 1:
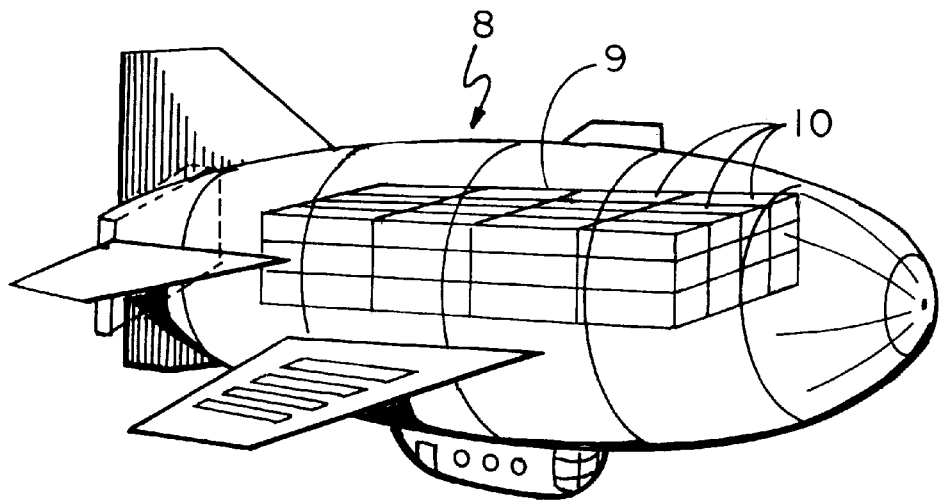
FIG. 1 illustrates a perspective view of an airship housing the steam-filled cells of this invention.
Figure 2:
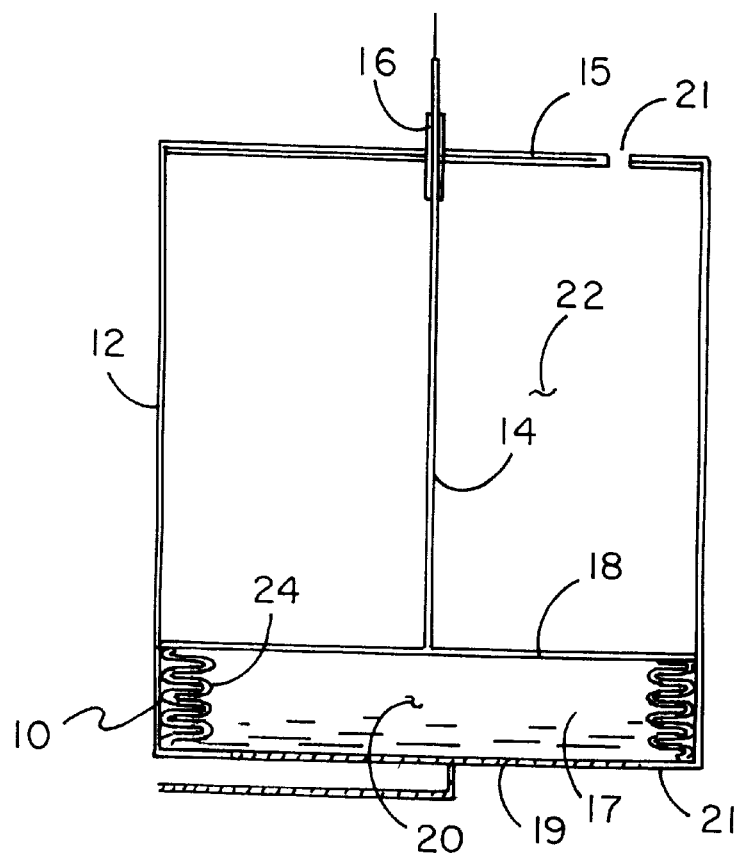
FIG. 2 illustrates a cross-sectional side view of a cell at equilibrium.
Figure 8:
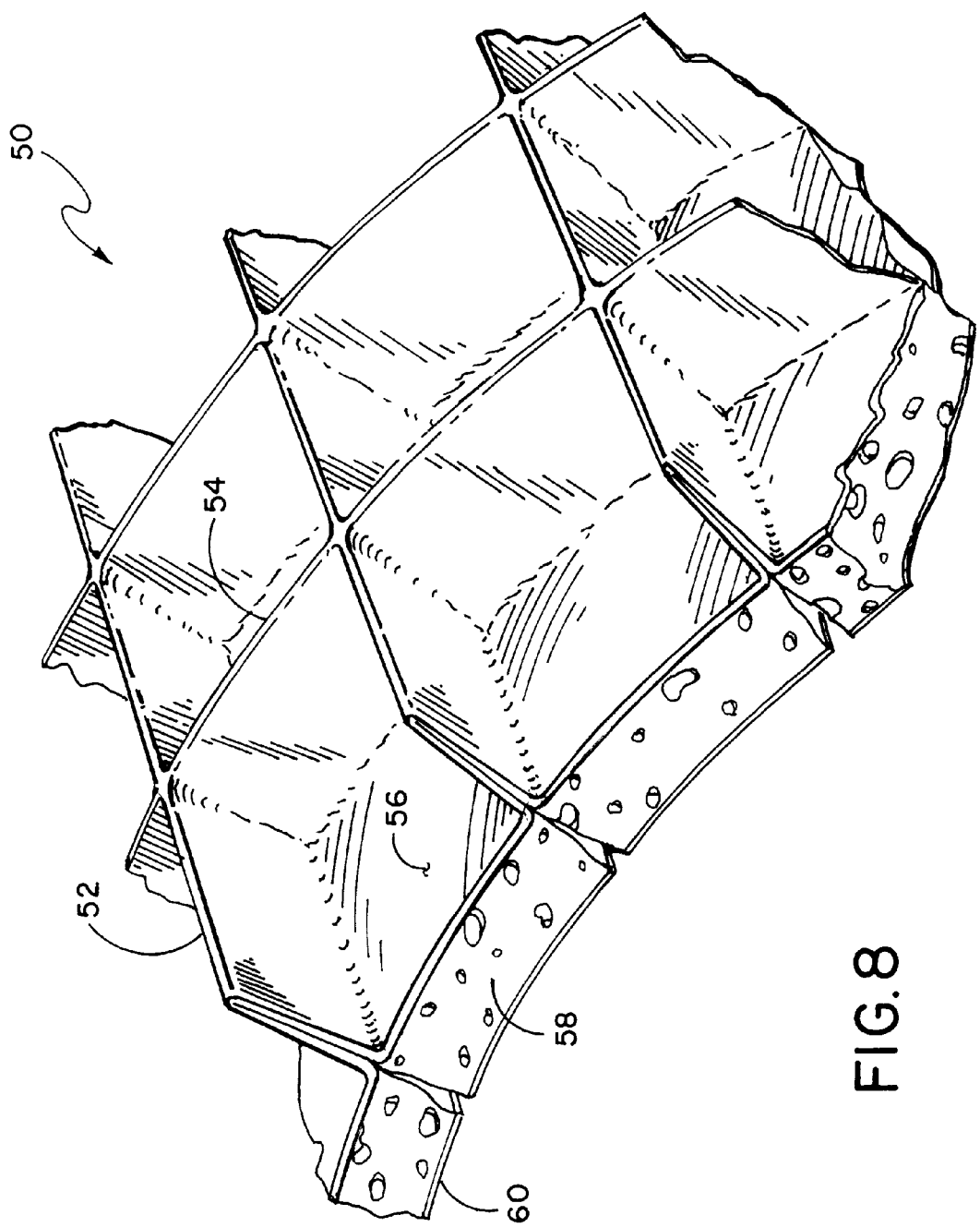
FIG. 8 illustrates a perspective sectional view of a cell wall having curved expandable walls with insulation provided to prevent heat loss.

FIG. 1 illustrates one type of airship 8 that could house an envelope 9 containing a plurality of the steam-filled cells 10 of this invention. FIG. 2 illustrates one embodiment of a cell 10 surrounded by a lightweight, durable outer envelope 12. Such outer envelope is not necessary for the basic functioning of this invention and is only utilized in some embodiments. Central shaft 14 runs through an aperture 16 formed in the center of the top 15 of envelope 12. It should be noted that although described and illustrated, it is not necessary to utilize a central shaft within such cell. Central shaft 14 extends through the center of envelope 12 until it reaches a point where it is attached to movable top cell wall 18. Movable top cell wall 18 can move up and down within envelope 12. Cell chamber 20 contains water which when turned into heated steam, causes an increase in pressure inside the cell and causes movable top cell wall 18 to move upwards through chamber 22. As water 17 at the bottom of cell 10 in cell chamber 20 is heated by microwave generator electrode plate 19, the water is transformed into steam, and the increased pressure created by such steam forces movable top cell wall 18 to move in an upward direction toward top 15 of envelope 12. Although microwaves are utilized in this embodiment to provide the heat to transform the water into steam, it should be noted that other heat sources can be utilized. For example, other wave-type or plasma energy sources can be utilized as long as they are sufficient for the energy produced to heat the fluid within the cell to a hot, vaporous state and that such energy can be transmitted throughout the cell's interior to maintain the fluid's hot steam in a lighter-than-air state and to add thermal energy to the vapors. Movable top cell wall 18 is attached to accordion-folded bellows-like, flexible cell side walls 24 extending from the ends of movable top cell wall 18 to bottom 21 of cell 10. The flexible material, such as plastic, of the cell side walls 24 facilitates movement of the movable top cell wall during the expansion of the cell by steam pressure in chamber 20. A vent 21 can be provided at the top of chamber 22 to allow for the escape of air as top cell wall 18 rises within envelope 12. While the illustrated cell of FIG. 2 appears rectangular in cross-section, it should be noted that the expandable cells of this invention can be provided in other shapes such as a substantially round shape as seen in FIGS. 12–16. FIG. 8 also illustrates a section of an expandable round cell described in further detail below. It should be further noted that the interior of each cell can also contain lighter-than-air gases such as helium to aid the cell's lifting capacity. The steam in each cell is lighter than the air surrounding the airship, thus the cell and airship will float in the air. In a preferred embodiment, a mixture of helium with heated steam to fill the balance of the volume of the cell can provide additional lift. Where steam and a lighter-than-air gas, such as helium, are contained in the cell at the same time where the lighter-than-air gas is not heated by the heat source, such as microwaves, but the steam, such as water vapor is heated by such heat source, the thermal energy is transferred from the steam to the lighter-than-air gas by conduction, thus providing for a combination of steam and heated lighter-than-air gas.

Figure 3:
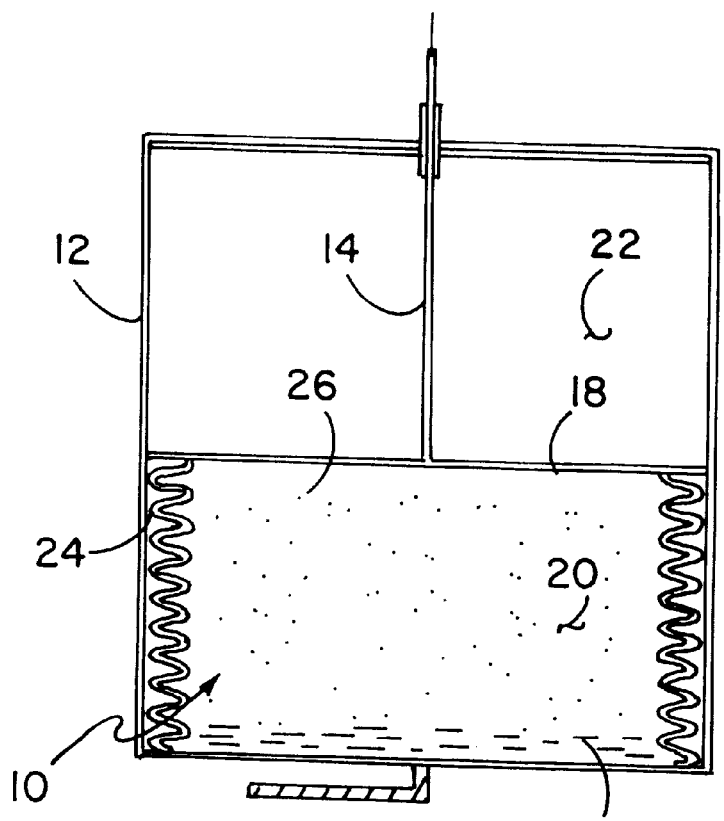
FIG. 3 illustrates a cross-sectional side view of a cell filling with steam.
Figure 4:
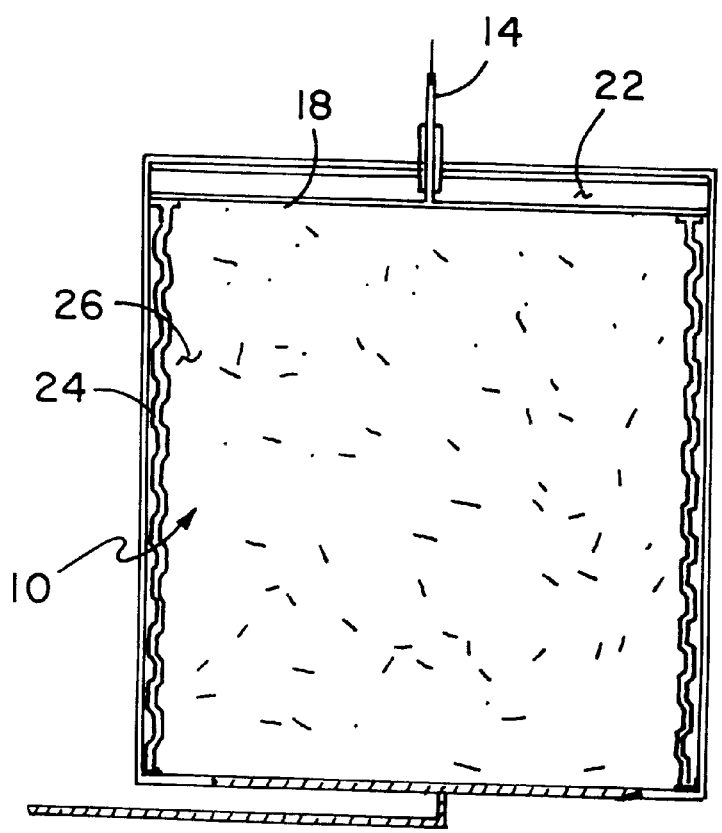
FIG. 4 illustrates a cross-sectional side view of a cell completely filled with steam.

FIG. 3 illustrates a cell during expansion of cell chamber 20 of cell 10 caused by production and expansion of steam therein with movable top cell wall 18 halfway up envelope chamber 22. FIG. 4 illustrates cell 10 at the point of its being full of steam 26, completely filling chamber 22.

Figure 5:
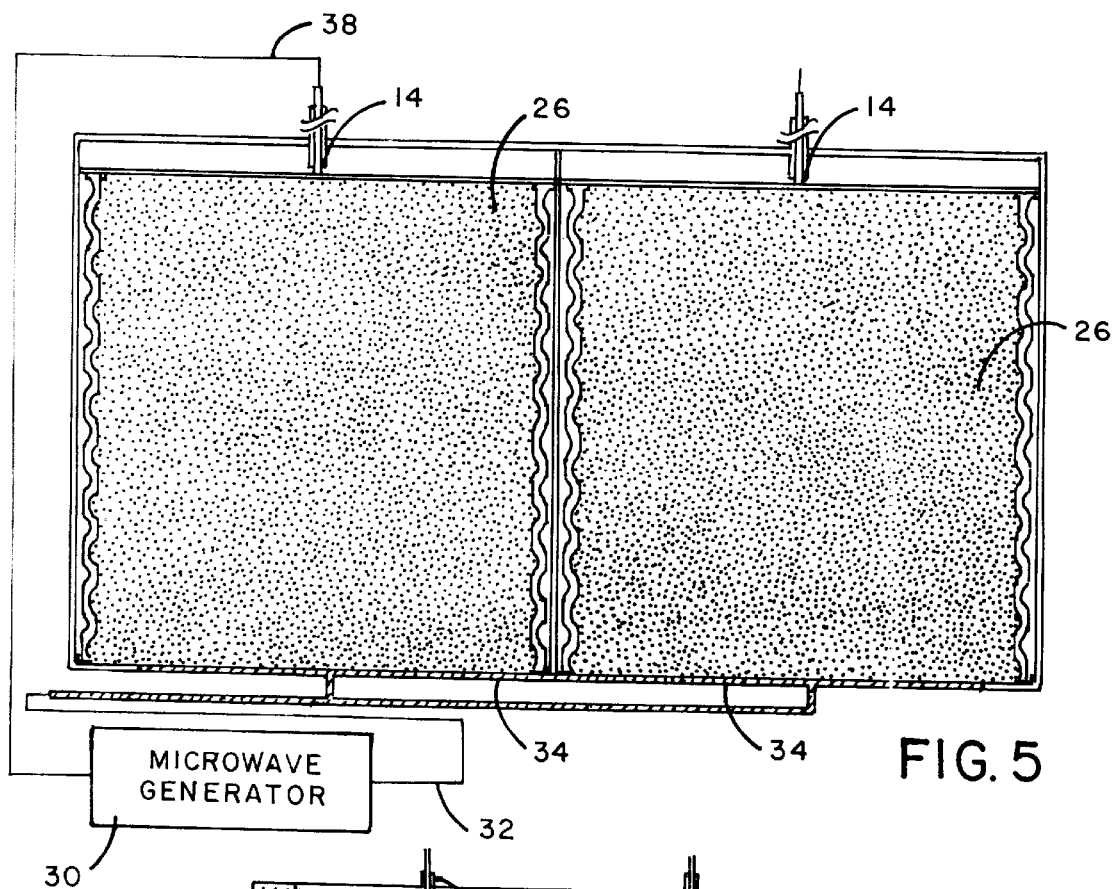
FIG. 5 illustrates a cross-sectional side view of two cells side-by-side filled with steam.

FIG. 5 illustrates two cells disposed side-by-side. Seen in this view is heat generator 30 which can be a wave-energy production means such as a magnetron, klystron or infrared heater. In the example illustrated, the heat generator is a microwave generator 30. Microwave generator 30 produces electrical oscillations which move through wire 32 and contact charge plate 34 of each cell, heating the water contained at the bottom of chamber 20 of each cell. Wire 38 extends from central shaft 14 of each cell to the negative pole of microwave generator 30. In some embodiments the microwave generator can have its microwaves conducted to the cell(s) through a microwave wave guide.

Figure 6:
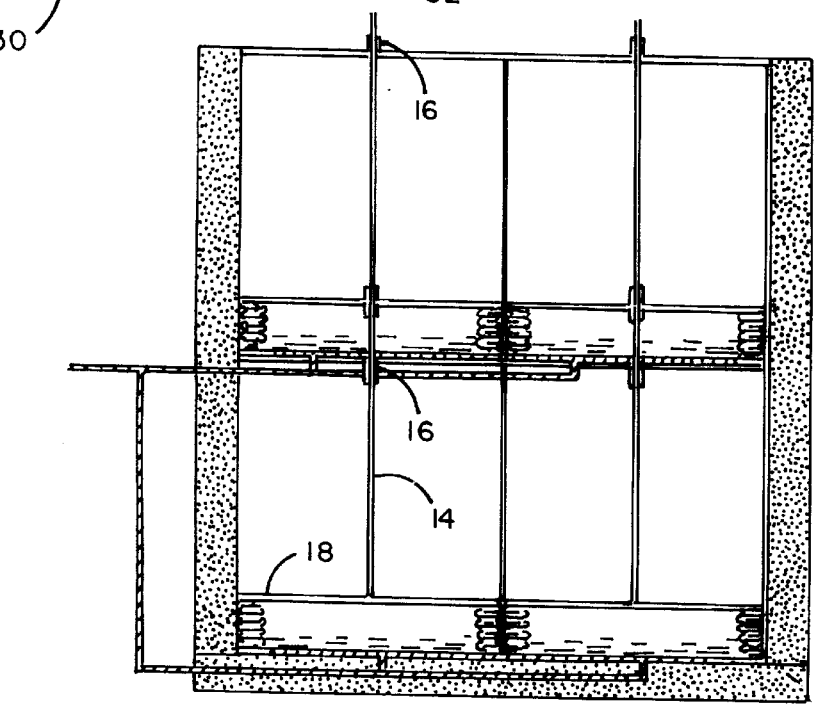
FIG. 6 illustrates a cross-sectional side view of multiple layers of the cells of this invention.

FIG. 6 illustrates four cells of this invention. Seen in this view is central shaft 14 extending from movable top cell wall 18 through aperture 16 of one cell and continuing through aperture 16 in another cell of the plurality of cells.

Figure 7:
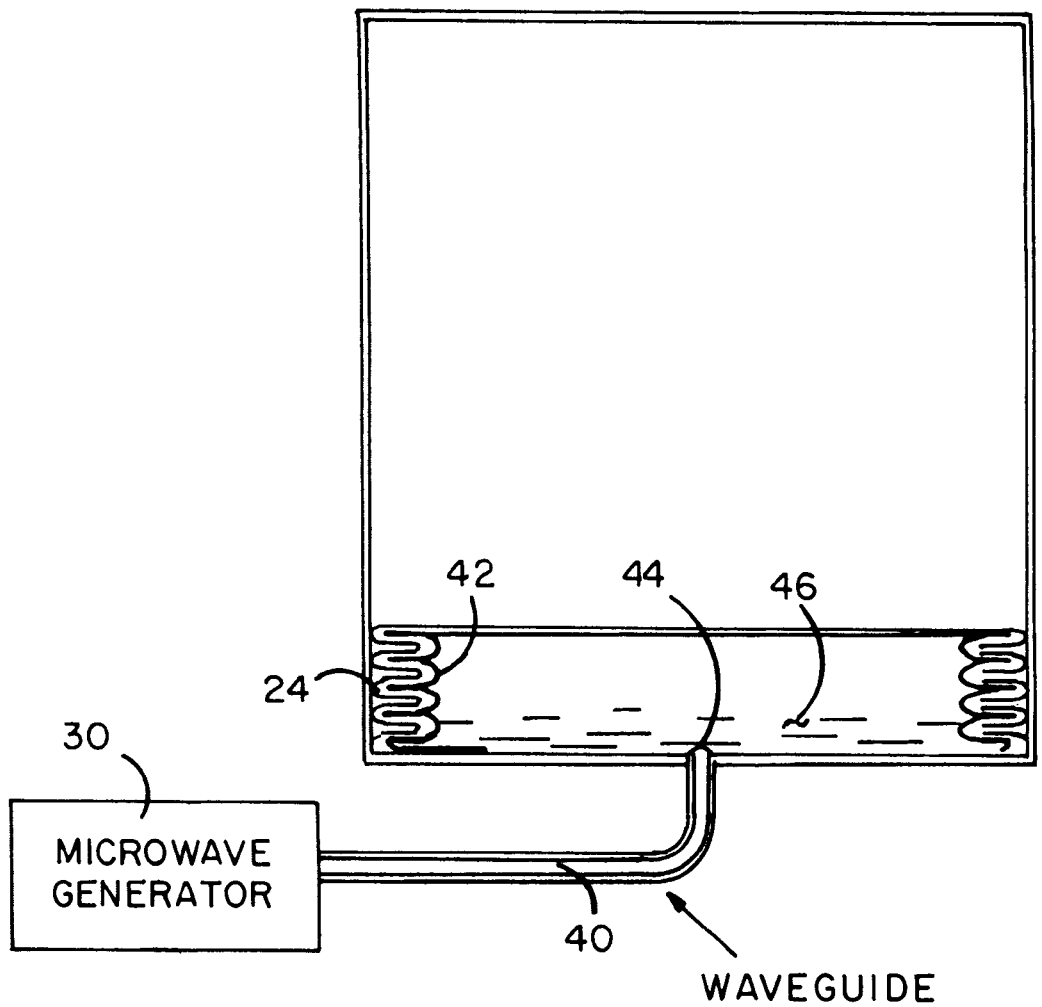
FIG. 7 illustrates a cross-sectional side view of a cell using a wave guide.

FIG. 7 illustrates a cell using a microwave wave guide 40 to direct the microwaves into the cell from microwave generator 30. The cell can be lined with a metalized surface 42 to provide a reflective surface for the microwaves. The irregular shape of bellows 24 also helps the waves to scatter in all directions within the cell to more efficiently heat water 17 to create and maintain heated steam. In some embodiments a microwave transparent sheet 44 can be used to collect any condensed water 46 from the bottom of each cell but yet allow microwaves to pass therethrough into the cell. In yet further embodiments of the invention, other lighter-than-air gases can be mixed with heated steam in the cells, such as inert helium, to provide additional lift.

Figure 9:
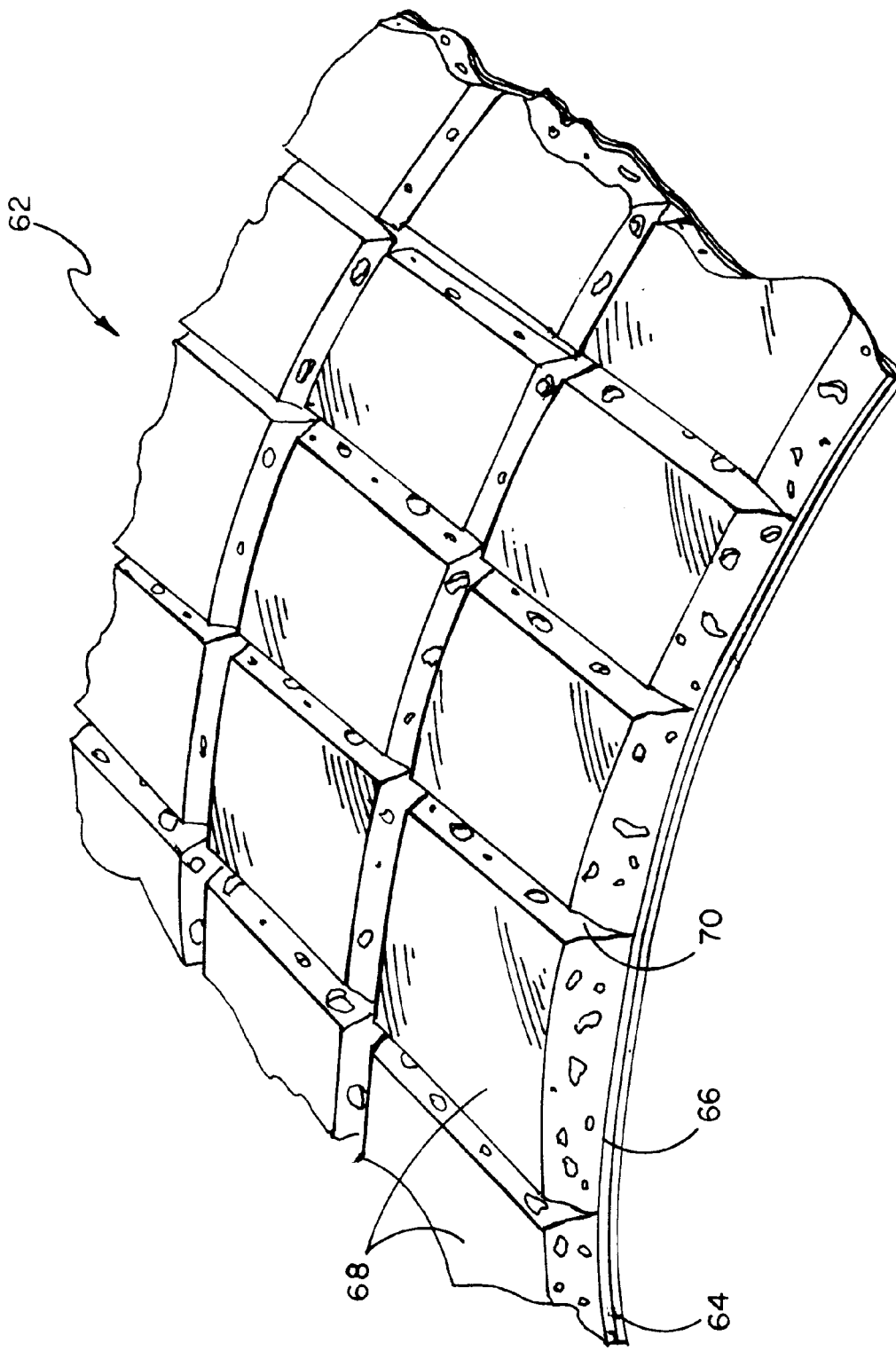
FIG. 9 illustrates a perspective sectional view of a curved cell wall having exterior insulation.
Figure 10:
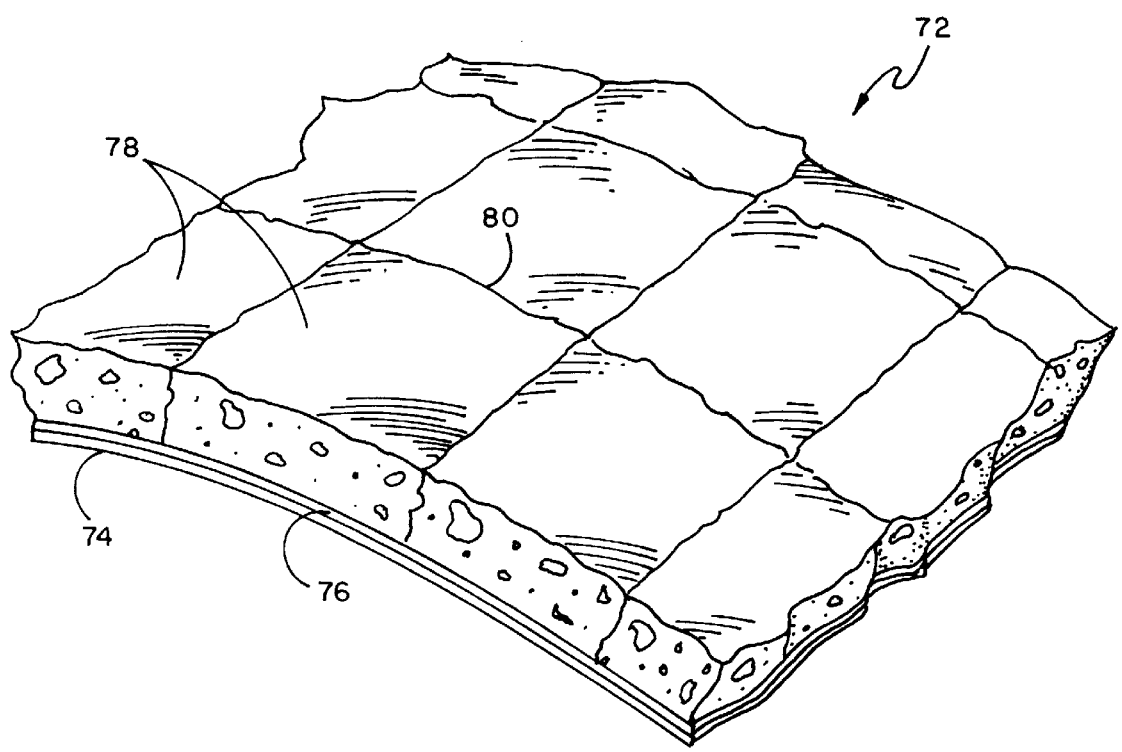
FIG. 10 illustrates a perspective view of a curved outer wall of a cell with yet further insulation.

FIG. 8 illustrates a section of a curved cell wall 50 which is part of a cell that has the ability to expand as the heated steam is generated therein. As heated steam is generated, the internal pressure within the cell increases. Outer wall 56 has a plurality of folds such as fold 52 and fold 54 in it which open as the cell expands, stretching outer wall 56. Inside segments of outer wall 56 have insulation thereon to retain heat inside the cell, such as insulation segment 58 which segments spread apart from one another as the outer walls expand by stretching open the folds such as folds 52 and 54. A metalized reflective coating 60 can be applied to the inner side of the insulation to further aid in microwave reflection, promoting internal heat reflection and retention. The insulation can be very lightweight. Aerogel-type insulation can be used to help maintain the lightness of the cell. In some embodiments the cell can utilize such insulation on its exterior, such as seen in FIGS. 9 and 10. In FIG. 9 the insulation segments 68 can have V-shaped grooves 70 defined therebetween to allow for some flexure as the cell expands. The plastic of cell wall 66 can be internally coated with reflective coating 64 to help reflect the heat created by the microwaves within the cell. FIG. 10 illustrates an embodiment similar to that of FIG. 9, but without the V-shaped grooves disposed between insulation segments 78. The insulation segments abut one another such as at junction 80. Plastic cell wall 76 can also be lined with reflective coating 74 which can be a vacuum-deposited metallized coating to aid the reflection of the microwaves inside the cell. The design of the cell of FIG. 10 is especially useful for insulated, rigid spheres such as the type illustrated in FIGS. 12, 17 and 18 and other embodiments as described below.

Figure 11:
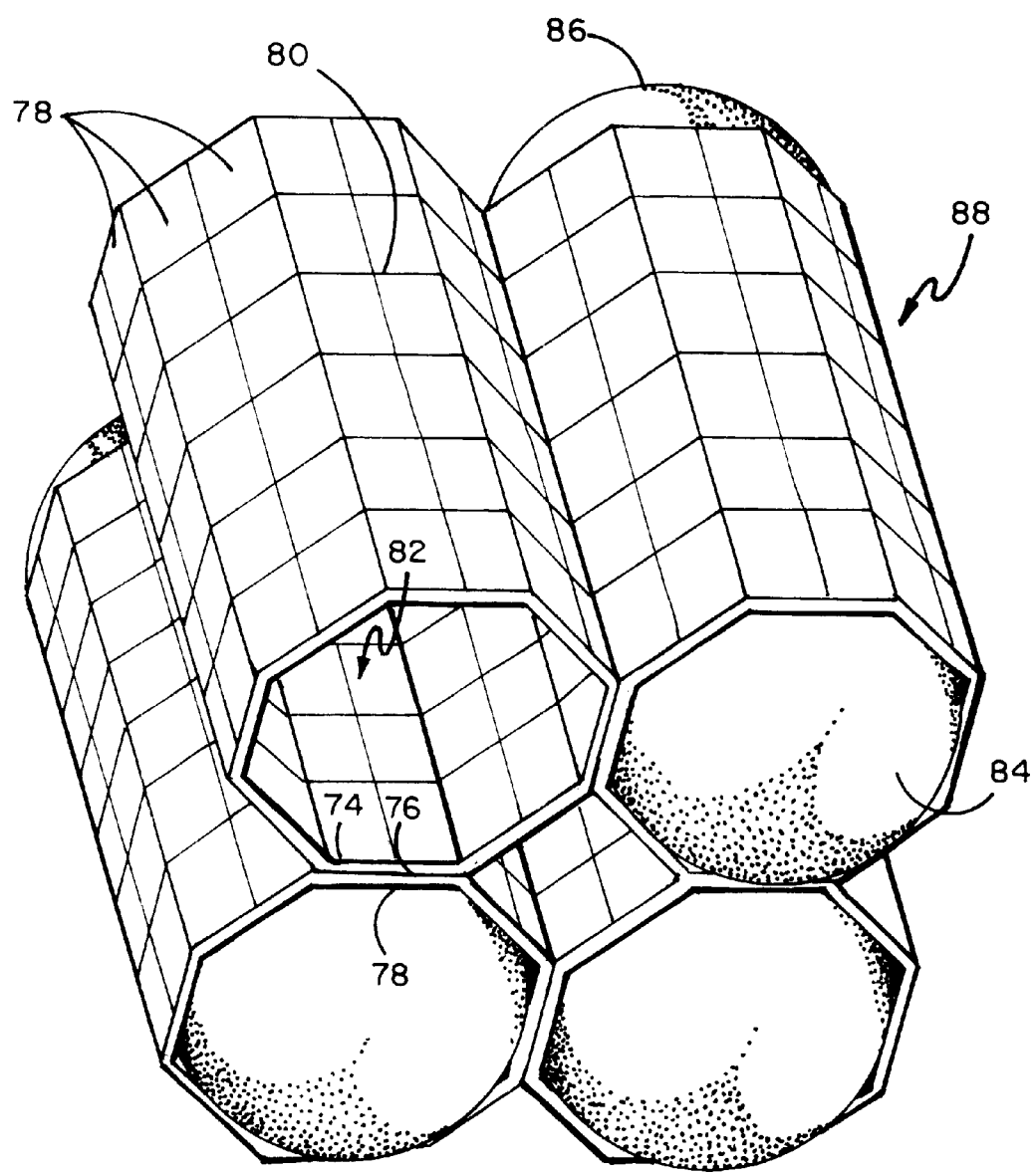
FIG. 11 illustrates a perspective view of a plurality of cells having insulation to retain heat therein.
Figures 12, 13:
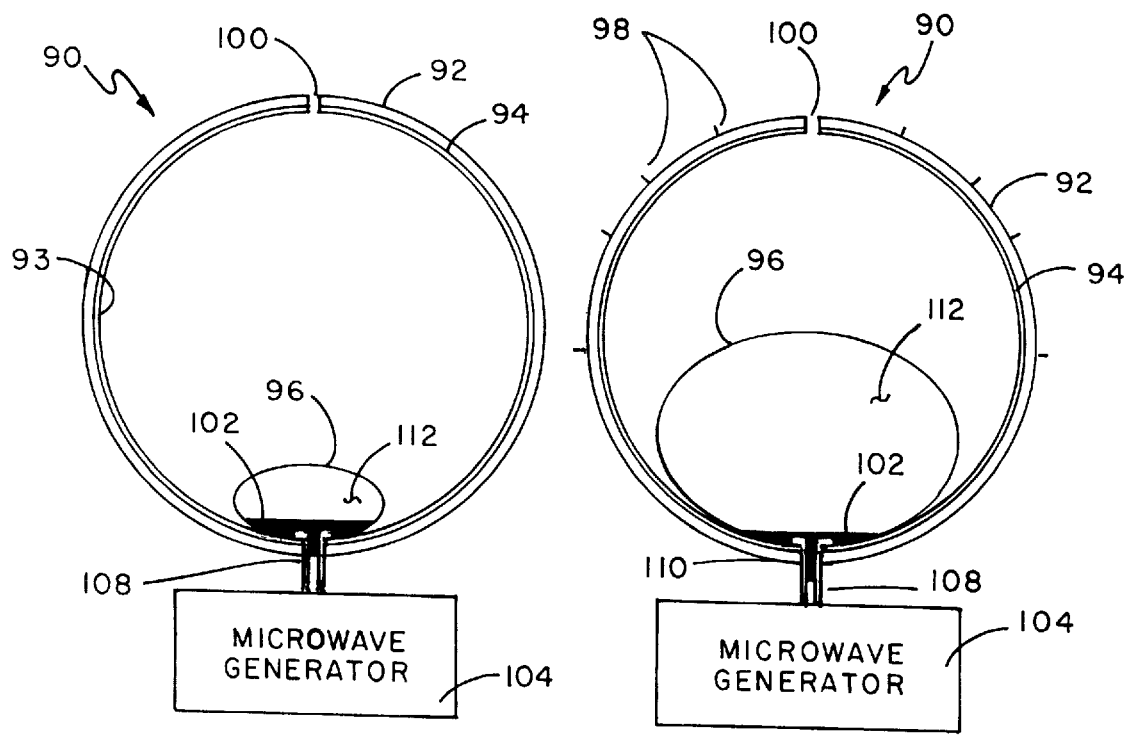
FIG. 12 illustrates a cross-sectional elevational view of a cell having an expandable member therein.
FIG. 13 illustrates the cell of FIG. 12 with the expandable member being further expanded.
Figure 14:
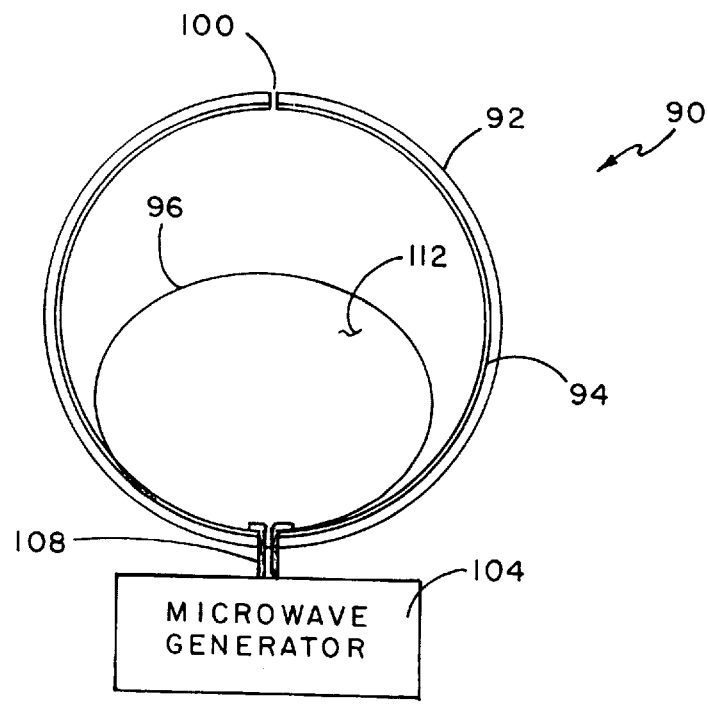
FIG. 14 illustrates the cell of FIG. 13 with the expandable member being still further expanded.
Figure 15:
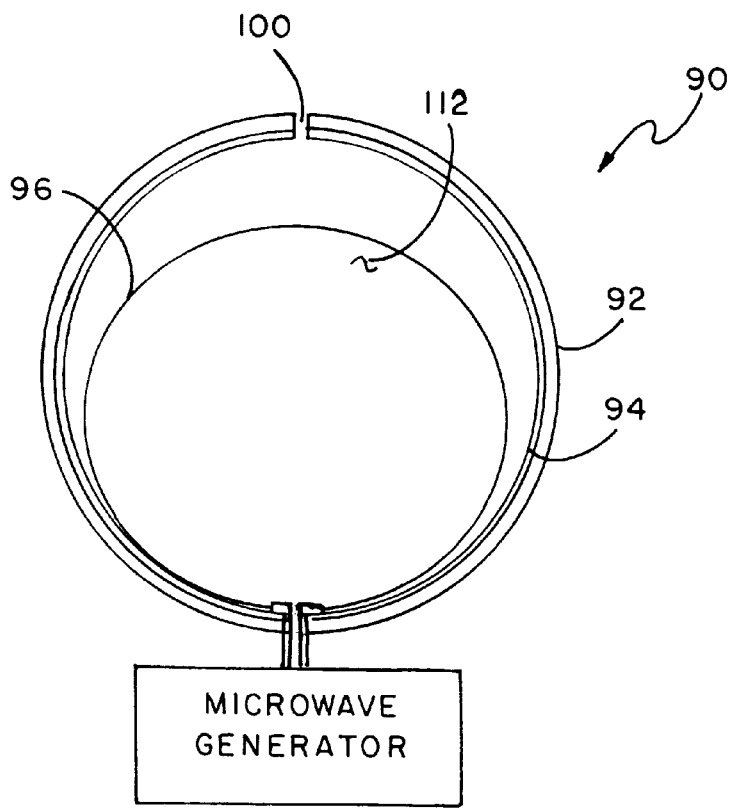
FIG. 15 illustrates the cell of FIG. 14 with the expandable member being even further expanded.
Figure 16:
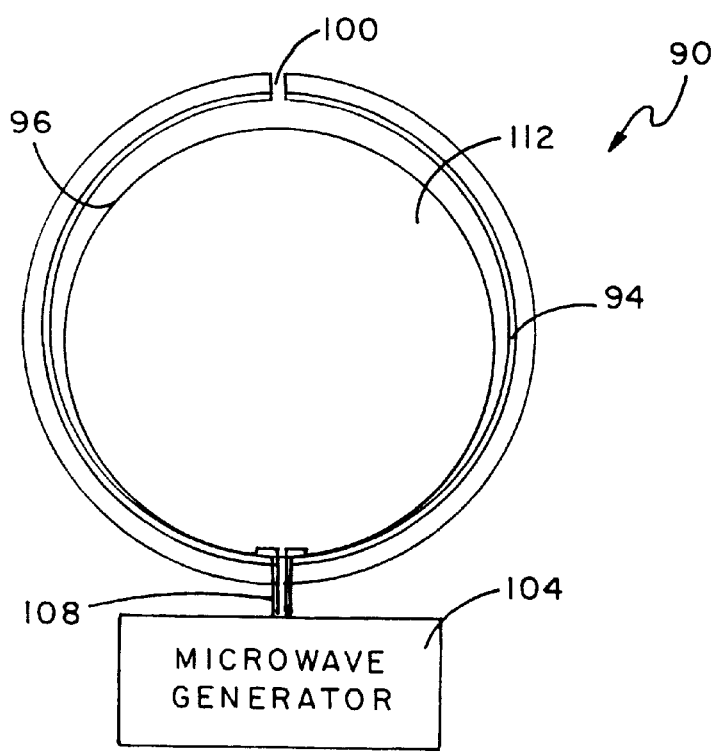
FIG. 16 illustrates the cell of FIG. 12 with the expandable member being yet further expanded.

FIG. 11 illustrates four cells 88 in which such steam generation can occur, with insulation 78 having junctions 80 between segments thereof, such cells having stretchable elastic plastic cell walls lined with metalized coating 74. First and second end caps 84 and 86 can close the ends of each cell. If such end caps are made of a stretchable plastic film, they will stretch as the cell wall insulation segments expand apart from one another.

A typical spherical cell 90, as seen in FIGS. 12–16, can utilize a microwave generator 104 to vaporize a liquid such as water 102 within an expandable balloon-like structure, hereinafter referred to as balloon 96, wherein the created steam 112 expands balloon 96 larger and larger until it substantially fills the inner volume of spherical shell 94. Spherical shell 94 can have an inner microwave reflective coating 93, seen in FIG. 12, and can have an outer insulative coating 92 made of a lightweight aerogel-type foam material which foams are well known and are very light in weight. Balloon 96 can be made of a microwave-transparent material 80 that the microwaves pass therethrough, and the balloon itself is not heated by the microwaves. The microwaves, though, do reflect off the inner microwave-reflective coating 93 of spherical shell 94 and are redirected back through balloon 96 where the steam is contained. To reinforce spherical shell 94 and help hold the aerogel foam in place and to support payloads, a mesh of carbon or aramid fibers 98 can extend around spherical shell 94. Vent 100 can be provided to allow for expansion of balloon 96. In some embodiments, helium gas can also be contained within balloon 96. Balloon 96 can be attached by hold-down members 106 extending from fluid column 108 from microwave generator 104.

Figure 17:
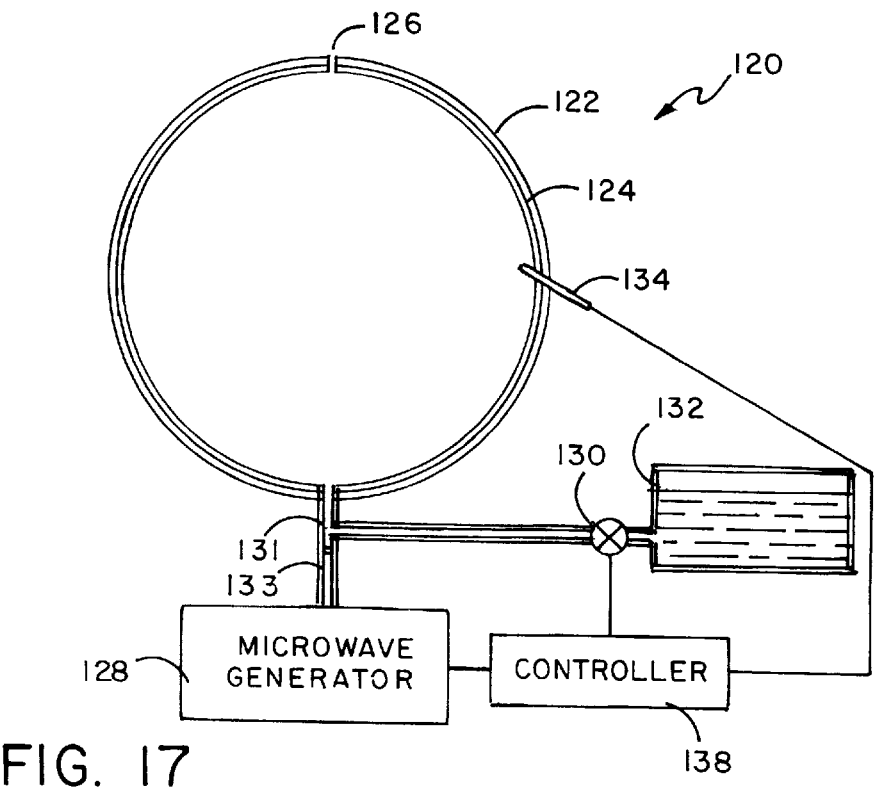
FIG. 17 illustrates a cross-sectional elevational view of a non-expanding sphere receiving heated steam therein.
Figure 18:
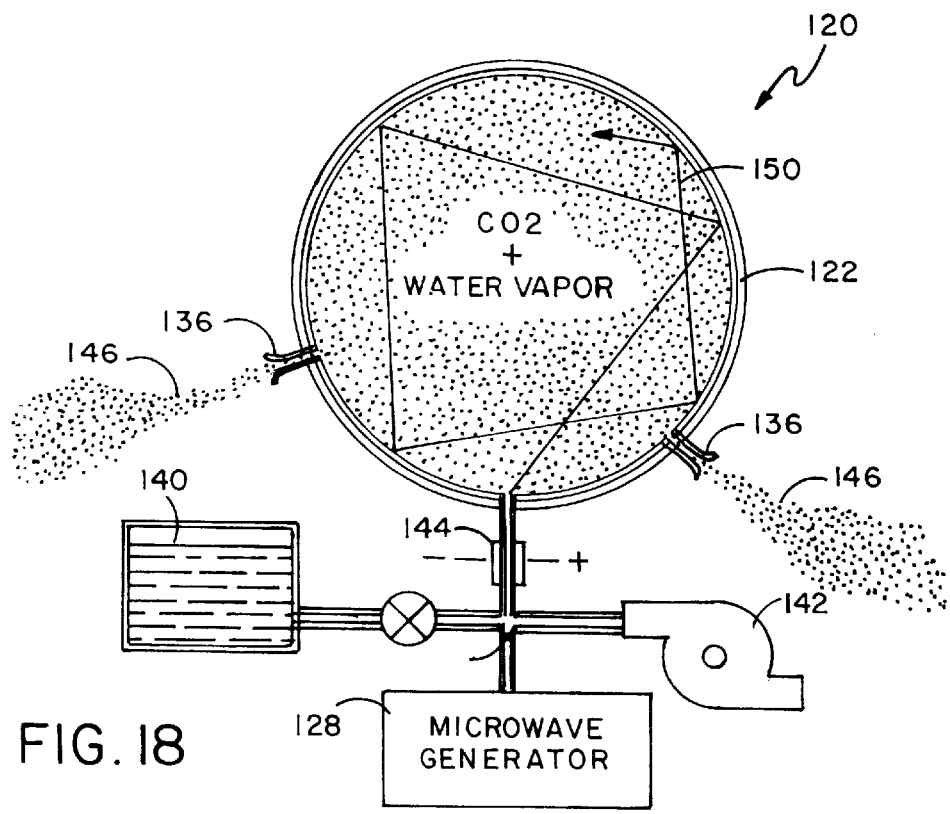
FIG. 18 illustrates a cross-sectional elevational view of a non-expanding sphere having exhaust ports which sphere receives combustion products which are heated.

The basic structure of this invention does not necessarily require an expandable cell wall. In FIG. 17 sphere 120 is shown having a spherical lightweight inner shell 124 that is coated to be microwave reflective and having an exterior of aerogel insulation 122. A vent 126 can be provided. Water 132 can be directed by computer controller 138 based on input from computer sensor 134 both to open valve 130 to allow water 132 to enter microwave chamber 131 and to activate microwave generator 128 at the appropriate time to heat water 132 when it is in microwave chamber 131. Hot steam is created which passes into the interior of sphere 120, and the microwaves continue to reflect within sphere 120 to maintain the steam in a heated state. Such reflected microwaves 150 are seen in the embodiment of FIG. 18 and would reflect in the same way within the other embodiments depicted herein. It should be noted that although the embodiments illustrated have a combined microwave wave guide, fuel-air entry, and plasma combination zone, that other embodiments can utilize multiple chamber entry ports. For example, there can be one port for the mixing and complete combustion of the fuel and a second port for the entry of microwaves into the sphere. If a single combined port is to be used, care must be taken that the microwaves do not short to the ground of the plasma arc. To avoid this situation, the two separate ports, as described above, can be utilized; but if a single port is used, then switching the plasma electrodes to a neutral, uncharged state when the microwave generator is operating will also solve this problem.

FIG. 18 illustrates an alternate embodiment of this invention wherein instead of utilizing water, a fuel 140 is burned with the fuel exhaust products being directed by a turbocharge blower 142 into sphere 120. A high-voltage corona 144 can be activated to assure complete combustion of fuel 140 so that its combustion products, being $CO_2$ and water vapor pass into sphere 120 in a heated state. As the combustion products cool because of their initial rapid expansion within sphere 120, microwaves from microwave generator 128 can pass through microwave transparent diaphragm 133 up into sphere 120 where they are reflected, as depicted by reflected microwaves 150, thereby continuing to heat the $CO_2$ and water vapor within sphere 120 to maintain its lighter-than-air state. In some embodiments directional exhaust ports 136 can be provided to allow for the venting of excess steam and exhaust products 146. In some situations this steam and exhaust products can be used to provide controlled directional movement to the sphere.

Although the present invention has been described with reference to particular embodiments, it will be apparent to those skilled in the art that variations and modifications can be substituted therefor without departing from the principles and spirit of the invention.

I claim:

1. A method of providing lift in a lighter-than-air airship disposed in surrounding air, said air having a volume density, comprising the steps of:

providing an expandable cell having an inside, said cell disposed within said airship, said cell having an internal microwave-reflective coating on the inside thereof;

providing an microwave-absorbing fluid within said cell;

generating microwaves within said cell;

heating said microwave-absorbing fluid by said microwaves within said cell;

vaporizing said fluid by said heat generated by said microwaves and forming steam within said cell;

expanding the volume of said cell by said created steam to a volume density less than that of the air surrounding said airship; and providing lift to said airship by said steam within said cell.

2. The method of claim 1 further including the step of:

providing in addition to said fluid within said cell an additional lighter-than-air gas therein.

3. The method of claim 1 further including the step of:

venting said steam from said cell to provide thrust to said airship.

4. The method of claim 2 further including the step of:

venting said steam and said lighter-than-air gas from said cell to provide thrust to said airship.

5. The method of claim 1 further including the step of:

insulating said cell against heat loss to aid in maintaining said heat creating said steam with a lightweight, thermally insulative aerogel foam.

6. The method of claim 4 further including the step of:

insulating said cell against heat loss to aid in maintaining said heat creating said steam.

7. The method of claim 1 further including the step of:

utilizing water as said microwave-absorbing fluid.

8. The method of claim 7 further including the step of:

providing a fluid reservoir to replenish said water after said water has been turned to steam.

9. The method of claim 1 further including the step of:

providing an outer thermally insulative chamber disposed around said expandable cell.

10. A method of providing lift in a lighter-than-air airship disposed in surrounding air, said air having a volume density, comprising the steps of:

providing an expandable cell having an inside within said airship, said cell having an internal microwave-reflective coating on the inside thereof;

providing a fuel and an oxidizer within the interior of said cell;

combusting said fuel and oxidizer to produce gaseous products of combustion;

generating microwaves within said cell;

maintaining said products of said combustion at a temperature at which its density is lighter than that of the surrounding air by heating said products of combustion by said microwaves;

expanding the volume of said cell by said gaseous combustion products to a volume density less than that of the air surrounding said airship; and providing lift to said airship by said lighter-than-air gas within said cell.

11. The method of claim 10 further including the step of:

providing a nozzle in said cell;

venting said products of combustion through said nozzle to provide thrust for movement of said lighter-than-air airship.

12. The method of claim 11 further including the step of:

insulating said cell with a lightweight thermally insulative aerogel foam insulation.

13. The method of claim 10 further including the step of:

providing an outer thermally insulative chamber around said expandable cell.

14. A lighter-than air airship disposed in surrounding air, said air having a volume density, comprising:

at least one cell having an expandable cell wall, said wall having an inside, said inside of said cell having a microwave-reflective coating;

a microwave-absorbing fluid disposed within said cell;

means to generate microwaves within said cell to heat said microwave-absorbing fluid to vaporize said fluid by said heat and form steam;

said steam expanding said cell to contain a volume density less than that of said surrounding air.

15. The airship of claim 14 wherein said microwave-absorbing fluid is water.

16. The airship of claim 15 further including:

a vent defined in said cell wall to allow venting of said steam for thrust to said airship.

17. The airship of claim 14 wherein said cell wall is insulated against heat loss by a lightweight thermally insulative aerogel foam.

18. The airship of claim 17 further including:

an insulative chamber surrounding said expandable cell.

19. A lighter-than-air airship disposed in surrounding air, said air having a volume density, comprising:

at least one cell having an expandable cell wall, said wall having an inside, said inside of said cell having a microwave-reflective coating;

means to create combustion between a fuel and an oxidizer in said cell to produce gaseous products of combustion in order to expand the volume of said cell by said gaseous combustion products to a volume density less than that of the air surrounding said airship; and means to heat said combustion products by microwaves provided within said cell.

20. The airship of claim 19 further including:

a vent defined in said cell wall to allowing venting of said combustion products for thrust to said airship.

21. The airship of claim 19 further including:

a microwave-absorbing fluid within said cell, said fluid heated by said microwaves to vaporize said fluid into a gas having a volume density less than that of the surrounding air.

* * * * *